US006879714B2

(12) United States Patent
Hutter

(10) Patent No.: US 6,879,714 B2
(45) Date of Patent: Apr. 12, 2005

(54) SYSTEM AND METHOD FOR ANALYSING AND DISPLAYING TWO- OR THREE-DIMENSIONAL SETS OF DATA

(75) Inventor: Marcus Hutter, München (DE)

(73) Assignee: BrainLAB AG, Kirchheim/Heimstetten (DE)

( * ) Notice: Subject to any disclaimer, the term of this patent is extended or adjusted under 35 U.S.C. 154(b) by 628 days.

(21) Appl. No.: 09/859,975

(22) Filed: May 17, 2001

(65) Prior Publication Data

US 2002/0041701 A1 Apr. 11, 2002

(30) Foreign Application Priority Data

Sep. 1, 2000 (EP) ............................................ 00118236

(51) Int. Cl.[7] ................................................. G06K 9/00
(52) U.S. Cl. ...................................... 382/131; 382/269
(58) Field of Search ................................. 382/131, 132, 382/167, 255, 266, 269, 275; 345/611; 378/4, 21

(56) References Cited

U.S. PATENT DOCUMENTS

| 5,930,498 A | 7/1999 | Tanaka ........................... 716/4 |
| 6,271,850 B1 * | 8/2001 | Kida et al. ................... 345/422 |

OTHER PUBLICATIONS

Sarah F. F. Gibson, "Constrained elastic surface nets: generating smooth surfaces from binary segmented data", Medical Image Computing and Computer–Assisted Intervention—Miccai '98. First International Conference. Proceedings, Medical Image Computing and Computer–Assisted Invention—Miccai '98. First International Conference. Proceedings, Cambridge, MA, U, Seiten 888–898, XP000965032, 1998, Berlin, Germany, Springer–Verlag, Germany, pp. 888–898.

* cited by examiner

Primary Examiner—Andrew W. Johns
Assistant Examiner—Shervin Nakhjavan
(74) Attorney, Agent, or Firm—Renner, Otto, Boisselle & Sklar, LLP

(57) ABSTRACT

The invention relates to a method of smoothing the staircasing which results from discretisation in two-dimensional images, or in a series of two-dimensional images forming a three-dimensional data set. To start with, a first two- or three-dimensional continuum data model of the images is generated in which adjacent or juxtaposed pixels form squares or cubes respectively which are in turn further divided into triangles or tetrahedrons. The corner points are assigned the chromatic or monochrome values of the pixels in the image. Chromatic or monochrome values at any intermediate values in the interior of the triangles or tetrahedrons can then be obtained, e.g. by linear interpolation. Smoothing the edges of the image is done by shifting the supporting points, preferably by not more than half a pixel. A further component of the invention is operators specially developed for this purpose representing a generalised measure of the curvature of the continuum model and dictating how the supporting points are to be shifted. The supporting points are shifted such that the curvature as a whole is reduced or minimised, after which the resulting image no longer exhibits the staircase lines of the original image. By relatively simple means, the continuum model thus achieved by using a plurality of now irregular triangles and tetrahedrons permits conversion of the resulting data set back into a regular, for example orthogonal, pixel image. It is likewise possible to extract two-dimensional triangulated surfaces of objects, in a given chromatic or monochrome value range, from the three-dimensional data set or to generate slice images in any desired planes not located in an imaging plane.

24 Claims, 9 Drawing Sheets

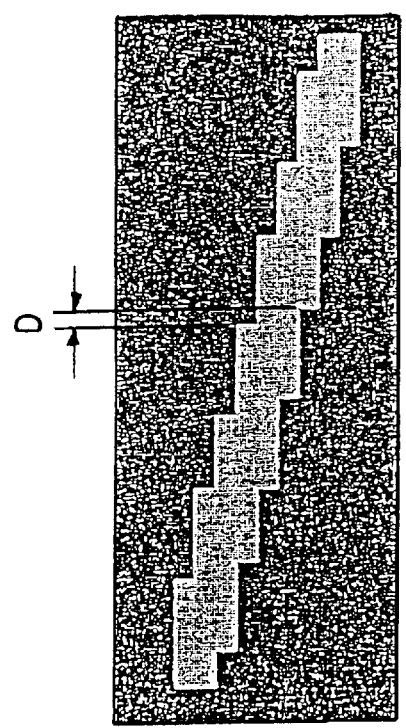
FIG. 1A
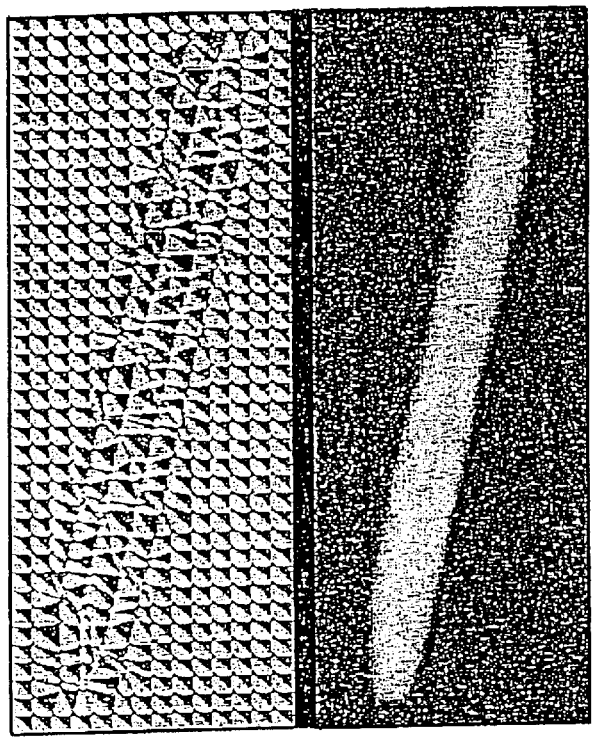
FIG. 1D
FIG. 1E
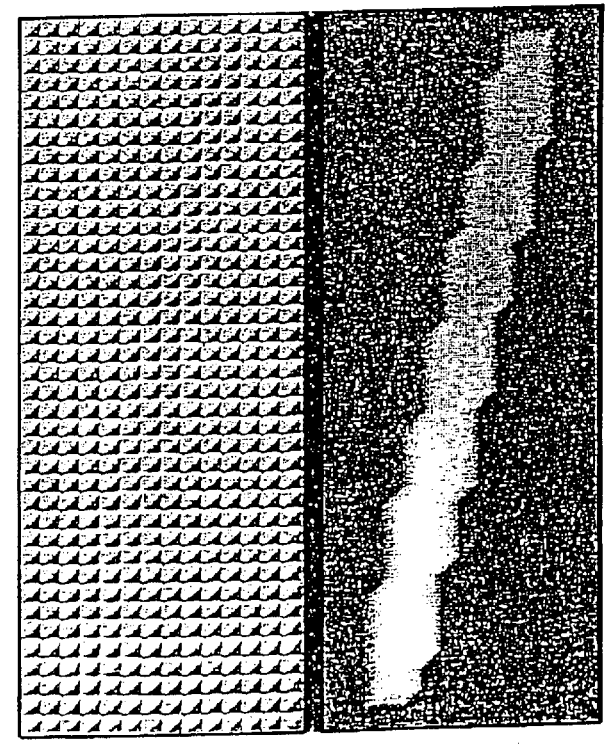
FIG. 1C
FIG. 1B

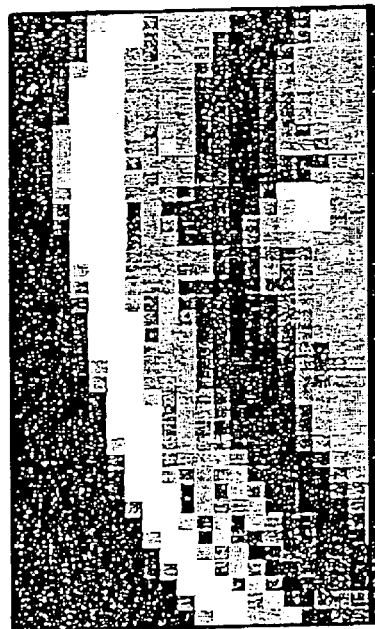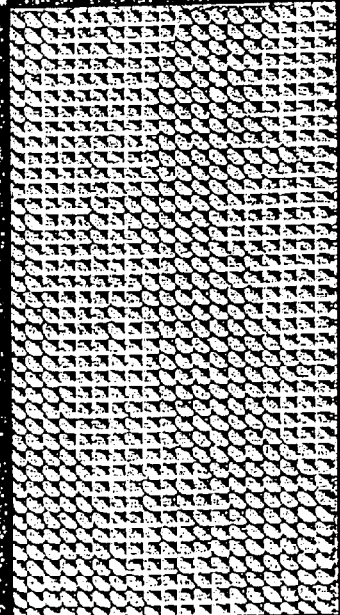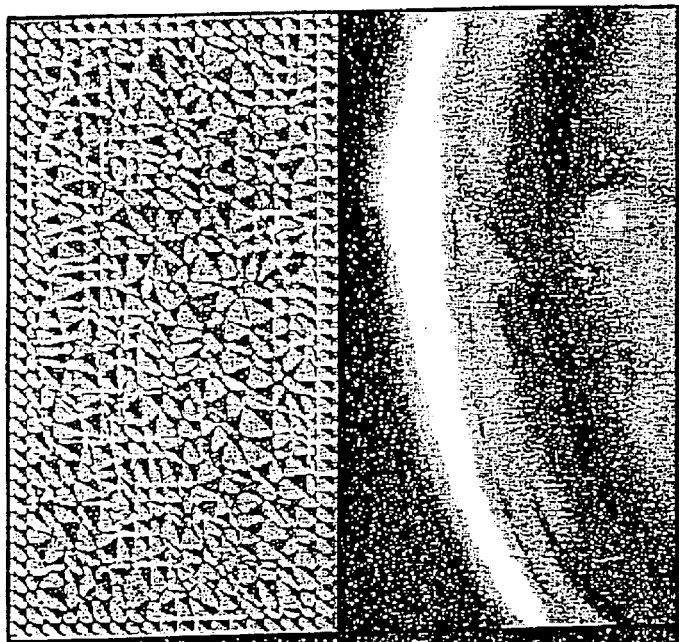
FIG. 2A
FIG. 2C
FIG. 2B
FIG. 2D
FIG. 2E

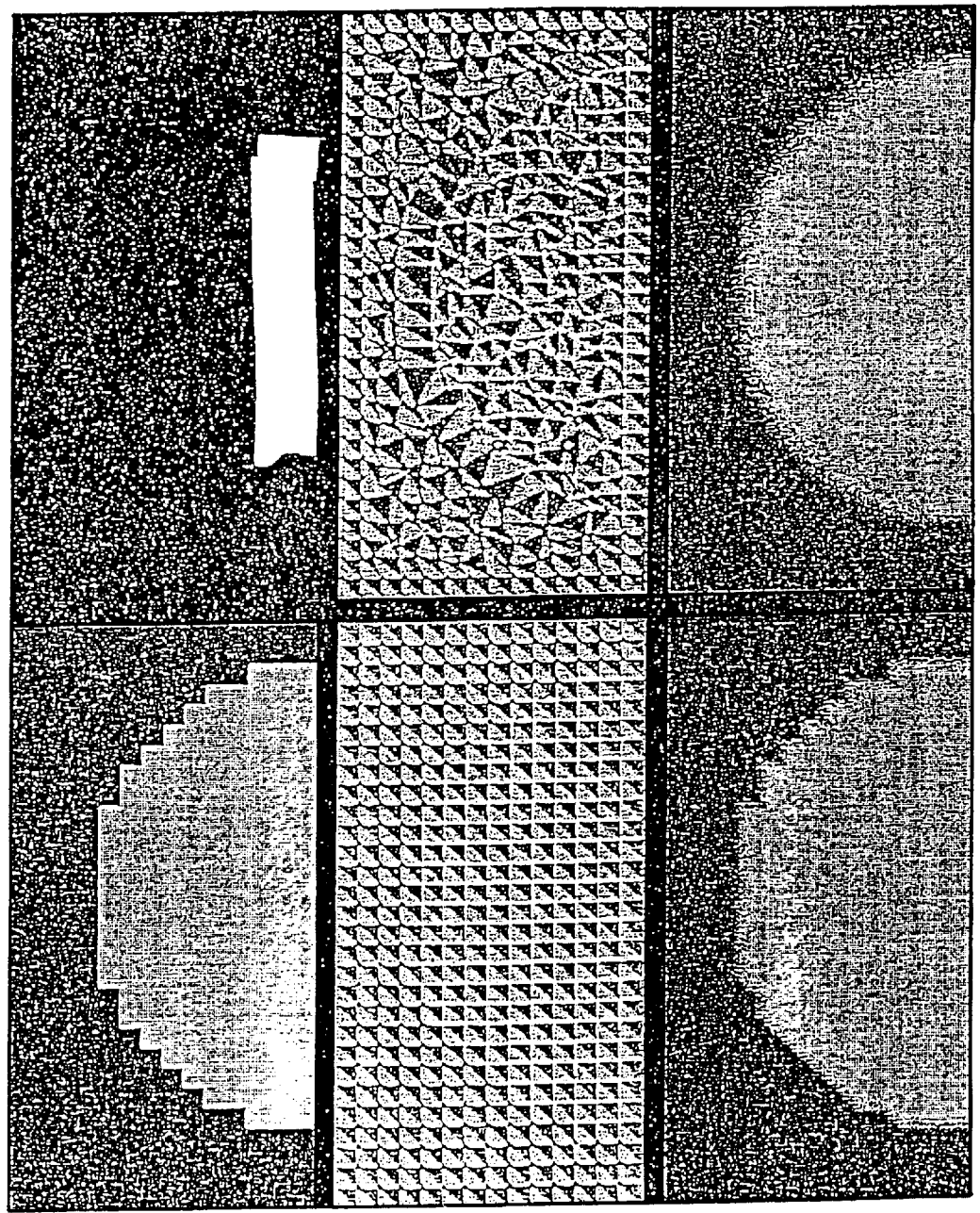

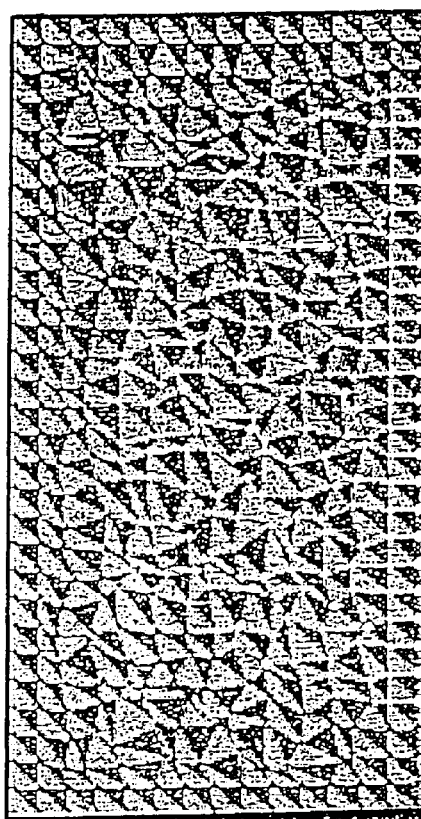
FIG. 4C
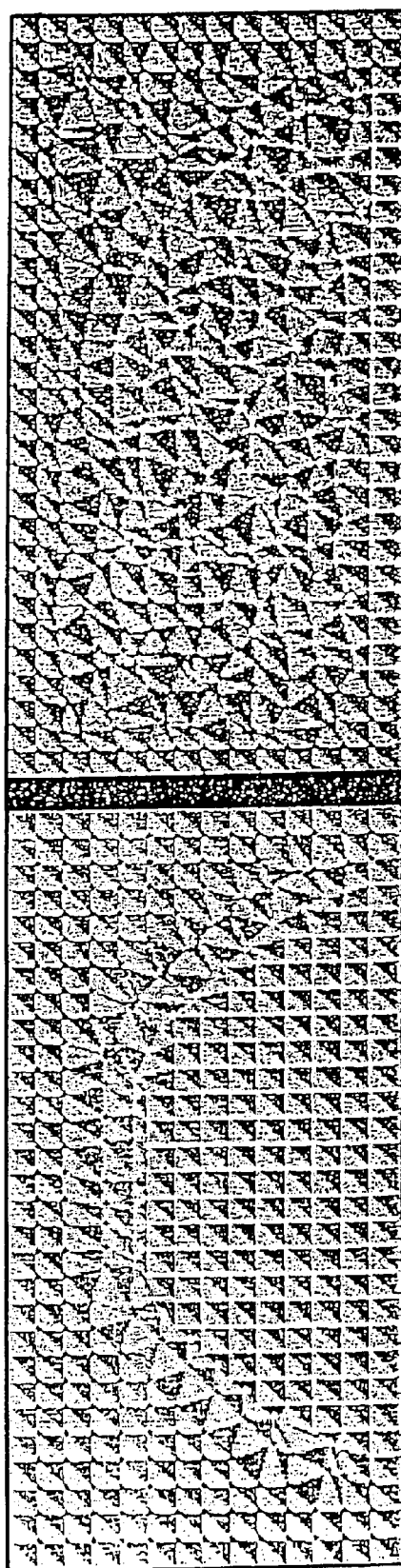
FIG. 4A
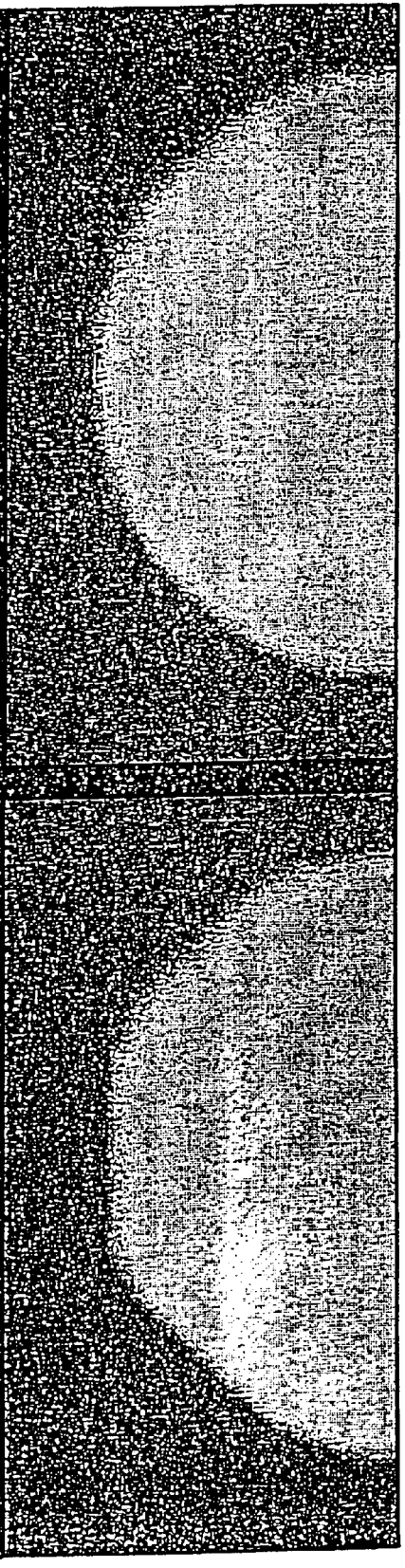
FIG. 4D
FIG. 4B

SYSTEM AND METHOD FOR ANALYSING AND DISPLAYING TWO- OR THREE-DIMENSIONAL SETS OF DATA

The invention relates to a system and method for analysing and displaying two- or three-dimensional sets of data or objects, to a computer program product comprising code sections with which the method is implemented, as well as to use of the method.

In various technical fields it is desirable to capture the structure of three-dimensional objects. Especially where medical examinations are concerned, or in preparation for surgery, as well as for example in pin-pointing the radiating of a tumour, it is desirable to capture the structure of three-dimensional objects such as, for example, cell tissue or bones as precisely as possible and to display the data set three-dimensionally or in the form of two-dimensional slice images. In this arrangement, use is made of known methods such as, for example, computer tomography or magnetic nuclear resonance tomography to image several slice or cross-sectional planes of the three-dimensional body to be examined, located parallel to each other, whereby from this series of two-dimensional images data are also established for displaying images in slice planes which are not located parallel to the imaging or imaged planes. When, for example, a slice image of the three-dimensional body located in a plane perpendicular to the imaging planes needs to be displayed, only discrete values are available as pixels for generating this slice image. When the spacing of the imaging planes is, for example, D, only pixels having the spacing D are available, on lines located parallel to each other, for generating a slice image in a plane located perpendicular to the imaging planes. To obtain chromatic or monochrome values of the pixels located in-between, interpolation routines are applied which, however, often furnish unsatisfactory results.

FIG. 1A shows an image of a two-dimensional inclined line. This image only comprises image data values at discrete supporting points, resulting in the line or object being displayed cascaded or staircased, unlike its shape in reality. Known image interpolation routines implement a local interpolation of the pixels which result in the image as shown for example in FIG. 1B. However, even this image still exhibits the staircasing of the body resulting from the image data values being available only at discrete locations. Although known anti-aliasing routines result in an enhanced display, as shown for example in FIG. 4B, this is only applicable, however, when an analytical description of the objects exists. This is, however, not the case with data obtained from scanning.

It is the object of the present invention to propose a system and method with which analysing and displaying two- and three dimensional sets of data can be improved.

This object is achieved by a method in accordance with claims 1 and 8, as well as by a system having the features in accordance with claim 18.

Advantageous embodiments are contained in the subclaims.

In accordance with a first aspect of the invention, the starting point are two-dimensional images of a two- or three-dimensional body, obtained for example by means of ultrasound, computer tomography or magnetic nuclear resonance tomography methods.

A first two-dimensional continuum data model of the images is generated by area elements being formed from adjacent pixels. These area elements can be suitably subdivided, e.g. by forming a square from every four adjacent or juxtaposed pixels, itself further divisible e.g. into two or more triangles. The invention is not, however, restricted to triangles. Any other suitable area elements are generally just as applicable. The corner points of the triangles or area elements are assigned the chromatic or monochrome values of the pixels of the two-dimensional image or of intermediate values obtained e.g. by interpolation, should the corner points fail to coincide with the pixels. Chromatic or monochrome values at any intermediate values in the interior of the triangles can then be obtained, e.g. by linear or some other form of interpolation. Where monochrome images are concerned the monochrome values can be interpreted as real function values and the interpolated continual or continuum model interpreted as the elevation area. The corner points of the triangles can be described by their (x,y) co-ordinates serving as supporting points and the assigned chromatic or monochrome co-ordinate or z-co-ordinate. Linear interpolation corresponds in this interpretation to a Gouraud shading. The corner points are shifted in the x-y plane, to achieve a smoothing of the image edges and thus to reduce or minimise the curvature of an area defined by a distribution of the chromatic or monochrome values. Thus, the supporting points are for example shifted without any need to modify chromatic or monochrome values or to introduce intermediate supporting points with chromatic or monochrome values which have to be determined.

It is to be noted that the term "curvature" in the sense of the invention not only covers the curvature as defined mathematically, but any kind of deviation from a linear structure, i.e. for example, the deviation of a curve from a straight line or that of an area from a plane. The following operators have a proven advantage in implementing the invention:

The operator termed IsoMin is defined as the area of the projection of an area element in the direction of the gradient, the area content being used as a measure of the curvature. In the three-dimensional case, this is the projection of a volume element, e.g. a tetrahedron, in which the volume of the projected tetrahedron is used as a measure of the curvature.

The operator termed IsoSmooth is defined as the mathematical square of the curvature, orthogonal to the direction of the gradient.

The operator termed GaussMin is defined as a linearised product of the main curvatures, i.e. in the two-dimensional case the product of the strongest and weakest curvature.

In accordance with one embodiment of the invention, supporting points in the x-y plane are shifted such that a curvature defined as a whole, e.g. by one of the aforementioned operators, is reduced or minimised, after which in the ideal case the resulting image no longer exhibits the cascaded or staircase lines of the original image seen in prior art methods. It is possible that at those points in the image established from implementing the method in accordance with the invention, which contain original data, new image data are obtained which differ from the original data, since interpretation is not done merely between these original data, but rather these original data are shifted owing to the method in accordance with the invention, in order to generate the desired image. However, preferably no change in the chromatic or monochrome values of the original data takes place, or only to a slight extent.

The two-dimensional continual model generated by the method in accordance with the invention, formed from a plurality of now irregular triangles, permits converting back the set of data thus obtained into a regular, for example orthogonal, pixel image by relatively simple means.

When considering a two-dimensional image having discrete original data at specific supporting points, as shown for example in FIG. 1A, whereby for instance brighter points can be observed as higher points of an area, then a basic area is shown, as for example in FIG. 1A, from which a brightly depicted body of constant height rises, which has a staircase profile. The result of implementing the method in accordance with the invention is shown by way of this simplified example in FIG. 1E, showing how the staircasing of the body has been totally eliminated.

The data used in accordance with the invention are preferably digital data which are machine-readable or saved in a digital memory.

The discrete supporting points of the two-dimensional image to be established, as existing in the original set of data, are observed in the embodiment as shown in FIG. 1 as corner points of triangles, such that the complete image area can be composed of triangular picture elements as shown in FIG. 1C, for example. One such triangulated image may be used as the starting image for the method in accordance with the invention, the corner points of the triangles being shifted so that a curvature—as defined by the above operators—of an area defined by the distribution of the chromatic or monochrome values is reduced or minimised. The resulting image is composed of triangles which are no longer in a regular arrangement and exhibit a geometry different to that shown in FIG. 1C. Due to the shift in each of the corner points, the triangles may exhibit a different shape, as shown in FIG. 1D. Points within the triangles are also assigned chromatic or monochrome values. This may be done, for example, by Gouraud shading, the area of the triangle being assigned a continually changing chromatic or monochrome value, as a function of the chromatic or monochrome values of the corner points such that within the area of the triangle the chromatic or monochrome values defined by the corner values continually merge into one another. It is from these triangles, shaded as such, that the final image as shown in FIG. 1E can be established.

In the method in accordance with the invention, the condition is preferably taken into account that each supporting point can be shifted maximally by a predefined maximum such as, for example, half a pixel. By the method in accordance with the invention, an irregular grid is generated from an existing regular grid of supporting points, by shifting the individual pixels, the amount of the shift preferably being within a predefined range. In this arrangement, specific directions or areas in which the pixel can be shifted may also be defined for each and every pixel.

Minimising the operators or reducing or minimising the curvature can be implemented by a variety of different methods. For example, in making use of random numbers a Monte-Carlo or simulated annealing method may be implemented, to find a local or global minimum, this method being applicable for all of the operators cited above. Other gradient-based methods which find local minima are applicable to a limited extent. Especially in the case of the IsoMin operator, a Gauβ-Seidl method can be used for minimising. To optimise the running time, it is good practice to select the data structure such that a predefined minimum level of accuracy is not breached by taking into account, for example, only a certain number of places after the decimal point or by using an integral instead of a floating accuracy during realisation on a computer. Limiting the possibility of shifting a data point to, for example, a maximum of half a pixel in possibly only one given direction or area further simplifies computing.

The following details the method for three-dimensional sets of data in a generalisation of the two-dimensional case.

In accordance with this aspect of the invention, a first three-dimensional data model of the body is generated from a series of two-dimensional slice images of the three-dimensional object, three-dimensional cubes or other suitable three-dimensional objects being formed from the supporting points located in adjacent planes in this three-dimensional model. These cubes can in turn be further divided into, for example, six irregular tetrahedrons. The interior of each tetrahedron is assigned, as a function of the chromatic or monochrome values at its four corner points, e.g. by linear interpolation, a specific chromatic or monochrome value. The corner points are described by their (x,y,z) co-ordinates (also termed supporting points) and the assigned chromatic or monochrome value (also termed t-co-ordinate). Linear interpolation in this interpretation corresponds to a Gouraud shading generalised to 3+1 dimensions, in which the corner points are shifted in the (x,y,z) direction to achieve smoothing of the object edges. Thus, supporting points are shifted without for example the chromatic or monochrome values needing to be modified or intermediate supporting points having chromatic or monochrome values to be established needing to be introduced. The operators defined for the two-dimensional case are suitably generalised to three-dimensions, these defining a measure for a curvature of the continuum model and the way in which the supporting points are to be shifted.

The supporting points are shifted in three-dimensional space or in the (x,y,z) direction by the method in accordance with the invention such that the curvature as a whole of an area defined by the chromatic or monochrome values, said area defined by the aforementioned t-co-ordinates, is reduced or minimised. Once minimised, the resulting image no longer features the staircase lines of the original image. A range in which a supporting point can be permissibly shifted can be likewise defined, for instance as a defined maximum distance by which each supporting point can be shifted, whereby, of course, different maximum limits can be defined in different directions, it also being feasible to restrict the scope for shifting to a certain preferred direction such as, for example, the z-axis or a preferred range.

The three-dimensional space generated by the method in accordance with the invention, formed by a plurality of e.g. irregular tetrahedrons, enables images of slice planes located anywhere in the body to be generated in a relatively simple way, since a model continually defined in space has been generated. It is also possible to convert the set of data thus produced back into a regular, for example orthogonal, set of volume elements or voxels.

It is likewise possible to extract two-dimensional triangulated surfaces of objects of a specific chromatic or monochrome value range from the data set, the resulting surface no longer exhibiting discretisation staircasing.

The preferred embodiments for the two-dimensional method, as described above, may also be put to use analogously in the three-dimensional method.

The methods in accordance with the invention advantageously allow an interpolation or smoothed display of a function existing only discretely, such that images or sets of data of enhanced quality can be generated.

Since, in accordance with one embodiment of the invention, the supporting points present at discrete points are shifted by, for example, a maximum of half a pixel, and the chromatic or monochrome values remain unchanged at the supporting points, there is no loss of information, a high-resolution image being obtained which simultaneously avoids unrealistic staircasing in the image. Eliminating this discretising staircasing without loss of resolution has been hitherto impossible with known methods.

It is also possible to use the method in accordance with the invention with two- or three-dimensional sets of data without anti-aliasing, to achieve subsequent anti-aliasing of image data and thus to enhance image or data quality.

With the method in accordance with the invention, it is furthermore possible to obtain a three-dimensional data model of a three-dimensional body with, for example, orthogonal voxels from a predefined set of data at specific supporting points, in order to implement, for example, a further analysis of three-dimensional objects on the basis of this set of data.

One such three-dimensional data set is needed, for example, in radiotherapy, for implementing optimum beam control so that as high a beam dose as possible can be generated in a tissue site, such that a tumour for example is obliterated with minimum harm to the surrounding healthy tissue. A further application, for example, consists of a high-accuracy reconstruction of object surfaces, e.g. of the spinal column, for achieving high precision in referencing and navigation with a navigation system.

The system in accordance with the invention comprises an input for an original set of data of a series of two-dimensional images, for producing any slice image of the three-dimensional body from this original set of data. The image thus produced is outputted to an output device, such as for example a display, or is saved as a data set onto a suitable medium. As an alternative, it is also possible to generate a three-dimensional data set which may serve as the basis for generating images in any slice planes, or for further processing the data.

As cited above, the curvature defined in each case by special operators for an area defined by chromatic or monochrome values is minimised.

Advantageously, the input data are sensed by means of suitable sensors while implementing an imaging method, such as for example computer tomography or magnetic nuclear resonance, it however also being possible to enter the input data via a suitable storage medium, such as for example a disk or CD, or however also via a data network.

The invention relates further to a computer program product loadable directly into the internal memory of a digital computer and comprising software code sections with which the steps in the method described above in accordance with the invention can be implemented when the product is run on a computer.

Likewise, the invention relates to a computer program product stored on a computer-compatible medium and comprising the following steps:
  reading a discrete original set of data describing a three-dimensional object at discrete supporting points;
  reducing or minimising the curvature of an area of the original set of data defined by a chromatic or monochrome value distribution; and
  generating two-dimensional slice images of the three-dimensional body, or generating a three-dimensional data set for a continual description of the body in three-dimensional space.

Furthermore, the invention relates to use of the method as described above for implementing radiotherapy or radiosurgery or for navigation purposes.

The invention will now be described by way of preferred embodiments, with reference to the drawings, in which:

FIG. 1A–E is an original image including discrete supporting points interpolated according to the prior art and analysed by the method in accordance with the invention;

FIG. 2 is a magnetic nuclear resonance image analysed according to the prior art and the method in accordance with the invention;

FIG. 3 is an image in accordance with an alternative embodiment of the method in accordance with the invention;

FIG. 4 is a comparison of the results of two embodiments of the method in accordance with the invention;

Figure 5C:
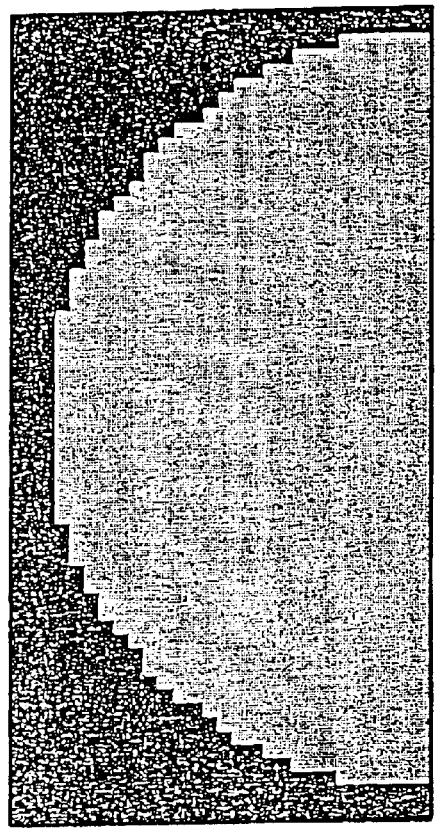
Figure 5D:
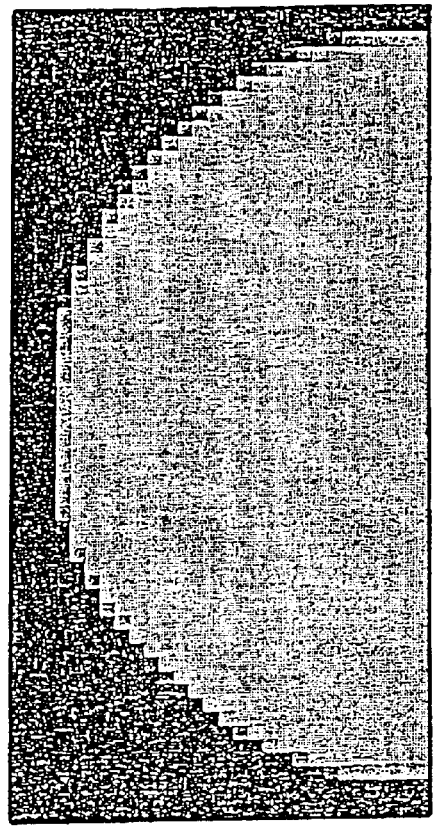
Figure 5A:
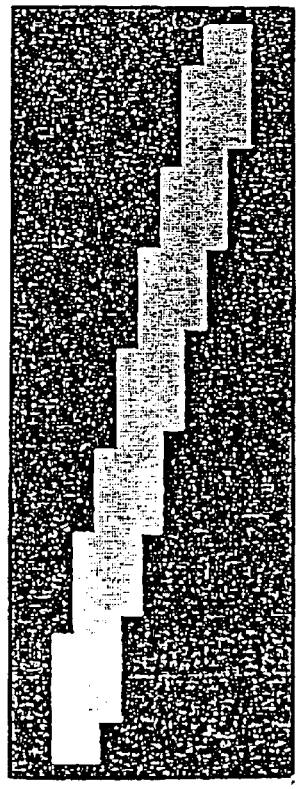
Figure 5B:
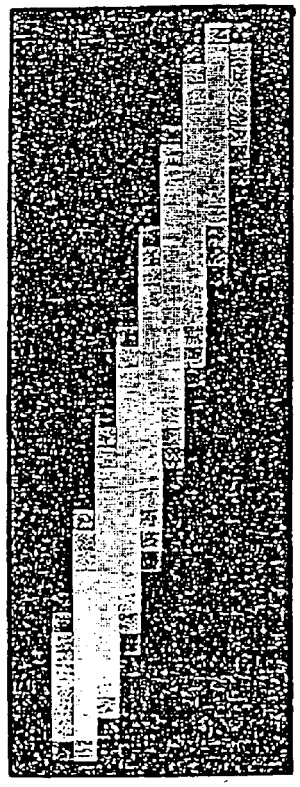
Figure 6:
Figure 7:
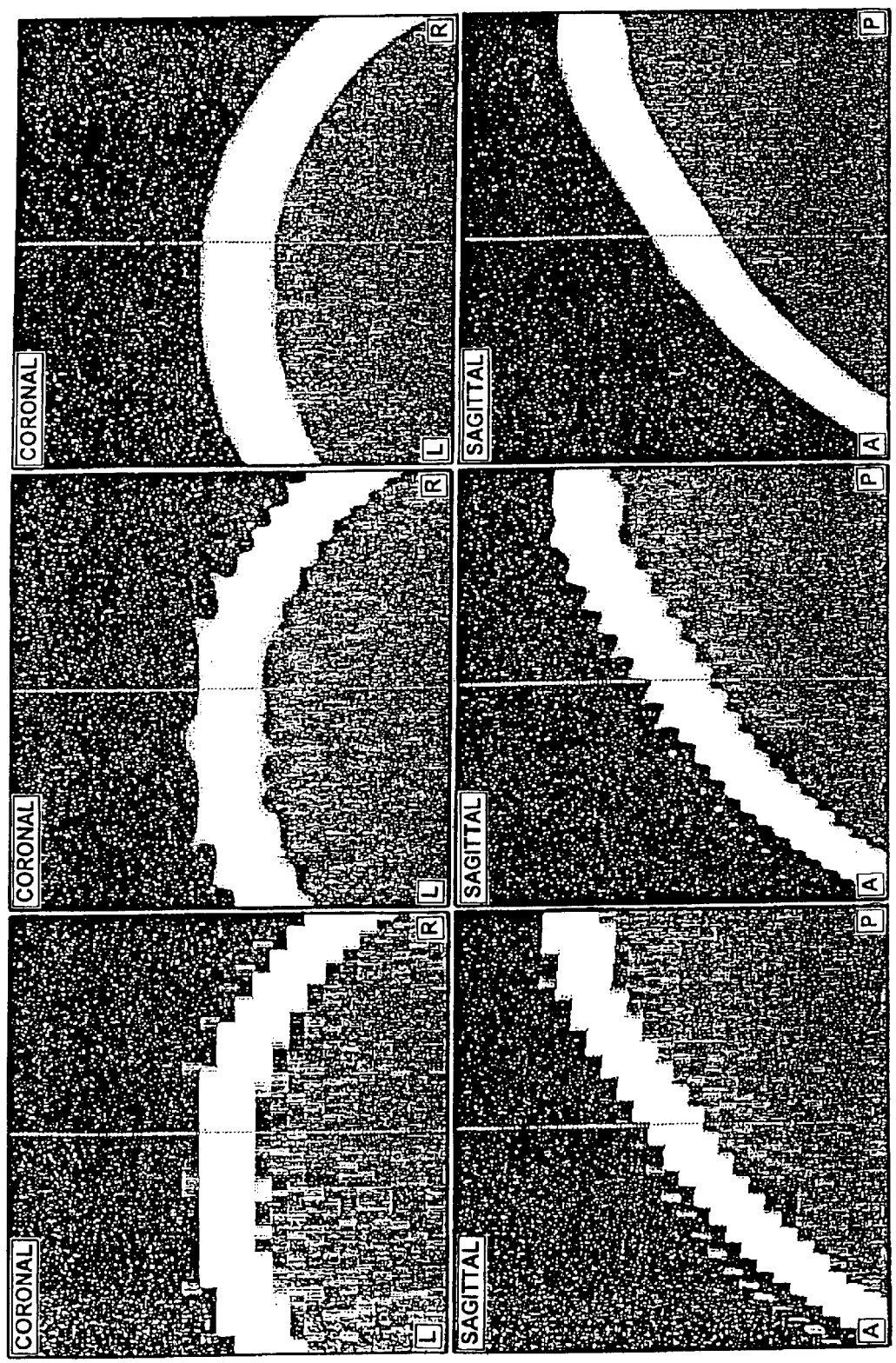
Figure 8:
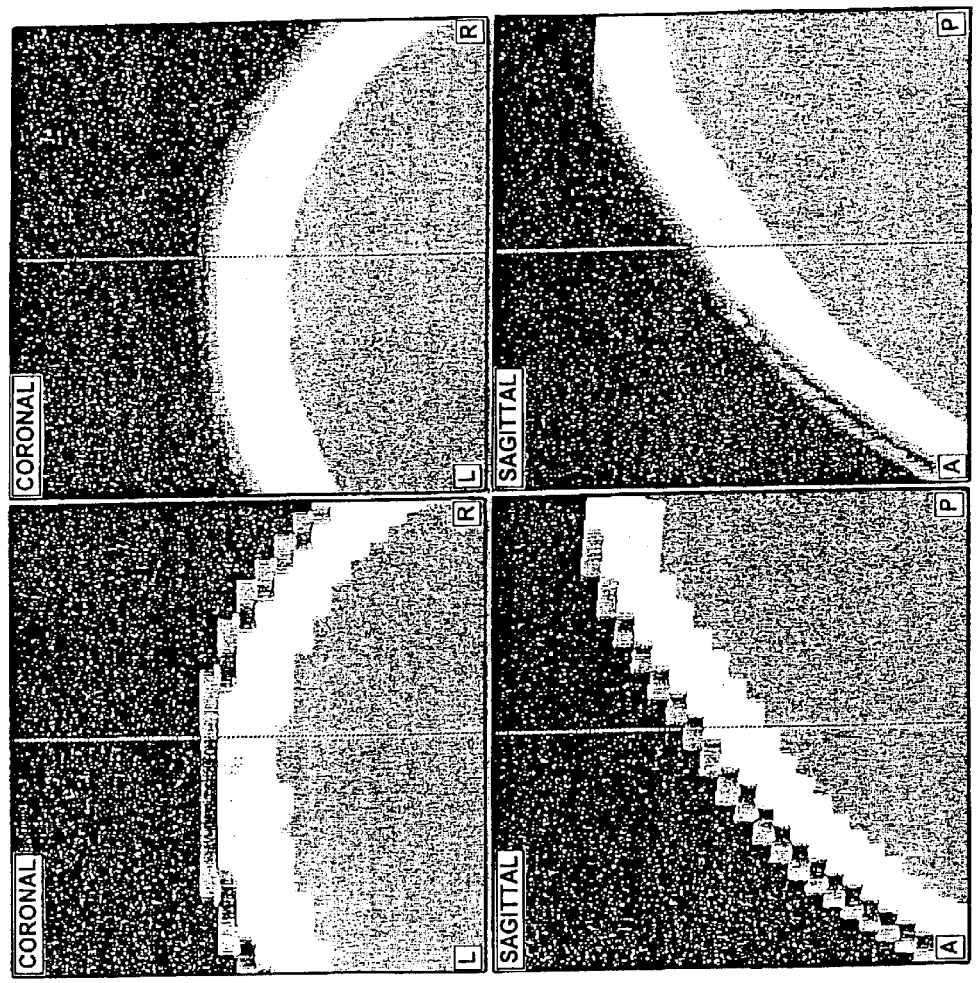
Figure 9:
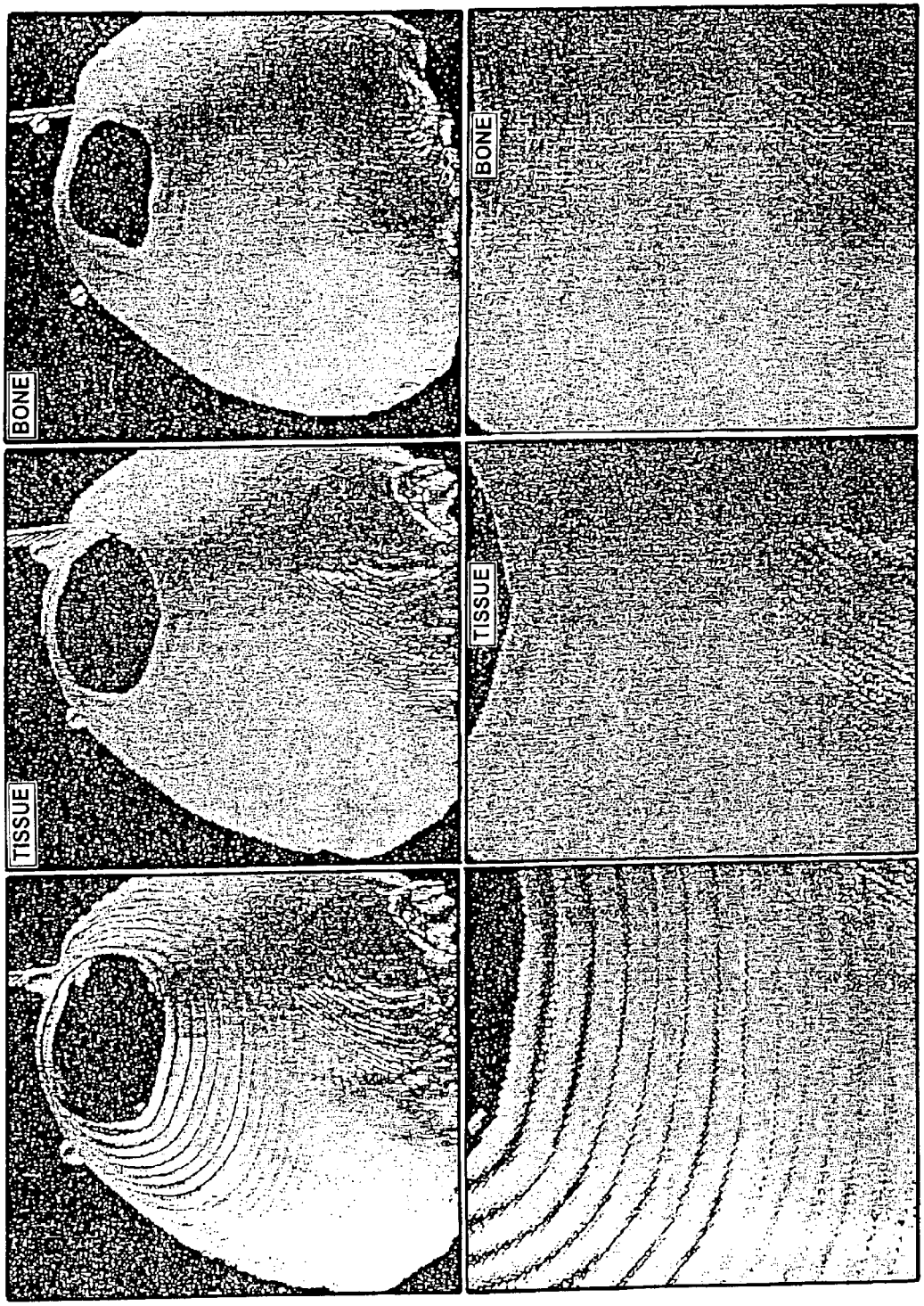

FIG. 5A–D is a further alternative embodiment of the method in accordance with the invention;

FIGS. 6 and 7 are a comparison of prior art images with an embodiment of the method in accordance with the invention;

FIG. 8 is a further image in accordance with an embodiment of the method in accordance with the invention; and FIG. 9 is a further comparison of prior art images analysed in accordance with the invention.

Referring now to FIG. 1A, there is illustrated a body running from top left to bottom right, formed by available data values on lines parallel to each other, resulting in staircasing of the profile of the body due to the supporting points of the image being spaced apart from each other by the distance D.

Referring now to FIG. 1B, there is illustrated the body as shown in FIG. 1A as linearly interpolated by a known method.

Referring now to FIG. 1C, there is illustrated the triangulation of the image as shown in FIG. 1A, from the original data set of which a regular grid of supporting points is produced which form the corner points of triangles. When applying the IsoMin operator as the operator to be minimised, the irregular grid as shown in FIG. 1D is produced from the regular grid as shown in FIG. 1C by the method in accordance with the invention. In this irregular grid, the individual supporting points are at most shifted by the maximum amount of half a supporting point spacing or pixel, such that a smoothed line is produced from the staircased profile. Making use of Gouraud shading of the shifted triangles defined by the individual supporting points produces the image as shown in FIG. 1E, which as compared to image 1B (prior art) exhibits a smoothed, substantially non-staircased profile. The other operators produce very similar results.

Referring now to FIG. 2A, there is illustrated a magnetic nuclear resonance image of a three-dimensional object processed as described in FIG. 1A–E, illustrating how the image shown in FIG. 2E, processed in accordance with the invention, is significantly better in quality than the image shown in FIG. 2B processed in accordance with the prior art, since the former exhibits no staircased lines, thus providing the user with a more realistic image of the three-dimensional body.

Referring now to FIG. 3, there is illustrated an embodiment of the method in accordance with the invention, in which the GaussMin operator has been employed as the operator for defining the curvature. The image produced from the original image A by prior art, as shown in FIG. 3C, still exhibits a staircase profile, whereas by making use of the GaussMin operator the substantially less staircased image shown in FIG. 3E is generated.

Referring now to FIG. 4, there is illustrated a comparison of two methods in accordance with the invention, by way of a circle. FIG. 4A illustrates the use of the IsoMin operator for measuring the curvature, while FIG. 4c shows the result of a triangulated image using the IsoSmooth operator. The images in FIGS. 4B and 4D, generated in accordance with the invention from the images in FIGS. 4A and 4C and analysed by triangulation, show that a better result is furnished by using a semicircle as the test object of the IsoSmooth operator.

Referring now to FIG. 5, there is illustrated an alternative embodiment of the invention using the IsoMin operator as the operator for defining the curvature. From the original images as shown in FIGS. 5A and 5C, the images in FIGS. 5B and 5D were generated with the same resolution. As is clearly evident, the method in accordance with the invention produces subsequent anti-aliasing.

Referring now to FIGS. 6 and 7, there is illustrated, from left to right, coronal and sagital slice images of a human head, the images on the left being a direct representation of the three-dimensional data set, the images in the middle being generated from a three-dimensional data set by tri-cubic interpolation, and those on the right being the result of a three-dimensional data set using the IsoMin operator in accordance with the invention. The images shown on the right illustrate that despite an original set of data existing only at discrete supporting points, lines are produced which are substantially free of staircasing.

Referring now to FIG. 8, there is illustrated on the right-hand side images produced in accordance with the invention, as compared to a direct representation of the three-dimensional data set as shown on the left.

Referring now to FIG. 9, there is illustrated on the left the representation of a body in accordance with the prior art. The images in the middle show the tissue structure, and those on the right the bone structure, of the same three-dimensional object, analysed however in accordance with the invention.

The invention relates in general to a method of smoothing staircasing resulting from discretisation in two-dimensional images or in a series of two-dimensional images forming a three-dimensional data set. To start with, a first two- or three-dimensional continuum data model of the images is generated in which adjacent pixels form squares or cubes respectively, which are in turn further divided into triangles or tetrahedrons. The corner points are assigned the chromatic or monochrome values of the pixels in the image. Chromatic or monochrome values at any intermediate values in the interior of the triangles or tetrahedrons can then be obtained, e.g. by linear interpolation. Smoothing the edges of the image is achieved by shifting the supporting points, preferably by not more than half a pixel. A further component of the invention is operators specially developed for this purpose, representing a generalised measure of the curvature of the continuum model, and dictating how the supporting points are to be shifted. The supporting points are shifted such that the curvature as a whole is reduced or minimised, after which the resulting image no longer exhibits the staircase lines of the original image. By relatively simple means, the continuum model thus achieved, formed from a plurality of now irregular triangles and tetrahedrons, permits conversion of the resulting data set back into a regular, for example orthogonal, pixel image. It is likewise possible to extract two-dimensional triangulated surfaces of objects from the three-dimensional data set in a given chromatic or monochrome value range, or to generate slice images in any planes not located in an imaging plane.

What is claimed is:

1. A method for generating a two-dimensional image from a two-dimensional original set of data defining a chromatic or monochrome value distribution, wherein:
   a) the supporting points of the original data set are corner points of rectangles, which are sub-divided into triangles;
   b) chromatic or monochrome values are assigned to the interior portion of the triangles by interpolating the chromatic or monochrome values at the corner points of the triangles, to generate a continuum data model;
   c) the corner points are shifted to reduce or minimise the curvatures of the area defined by the chromatic or monochrome value distribution, thereby shifting the continuum data model correspondingly; and
   d) a two-dimensional, more particularly orthogonal, image is generated from the shifted continuum data model.

2. The method as set forth in claim 1, wherein individual picture elements or pixels of the original data set, for minimising the curvature, can only be shifted within a predefined range.

3. The method as set forth in claim 1, wherein use is made of the area of the projection of a triangle in the direction of the gradient, for defining the curvature.

4. The method as set forth in claim 1, wherein use is made of the mathematical square of the curvature orthogonal to the direction of the gradient, for defining the curvature.

5. The method as set forth in claim 1, wherein use is made of the product of the main curvatures, for defining the curvature.

6. The method as set forth in claim 1, wherein use is made of a method based on random numbers, for reducing or minimising the curvature.

7. The method as set forth in claim 1, wherein use is made of a Gauβ-Seidl method, for reducing or minimising the curvature.

8. A computer program directly loadable into the internal memory of a digital computer and comprising software code sections with which the steps as set forth in claim 1 can be implemented, when the product is run on a computer.

9. Use of the method as set forth in claim 1, for controlling or implementing radiotherapy or for a radiosurgical method.

10. Use of the method as set forth in claim 1, for localising an object or navigating with a navigation system.

11. A method for generating a three-dimensional data set described by a series of two-dimensional sets of data, wherein:
   a) a first three-dimensional model, of the three-dimensional space is generated from the two-dimensional sets of data;
   b) the three-dimensional model is divided into three-dimensional objects, more particularly cuboids or tetrahedrons, which in turn can be divided into tetrahedrons or other three-dimensional objects;
   c) chromatic or monochrome values are assigned to the interior portion of the three-dimensional objects or tetrahedrons by interpolating the chromatic or monochrome values at the corresponding corner points, to generate a continuum data model;
   d) the corner points are shifted, to reduce or minimise the curvatures of the hyper area defined by the chromatic or monochrome value distribution, thereby shifting the continuum data model correspondingly.

12. The method as set forth in claim 11, wherein a new three-dimensional, more particularly orthogonal, volume data set is generated from the shifted continuum model.

13. The method as set forth in claim 11, wherein individual supporting points, for reducing or minimising the curvature, can only be shifted within a predefined range.

14. The method as set forth in claim 11, wherein use is made of the hyper area of the projection of a tetrahedron in the direction of the gradient, for defining the curvature.

15. The method as set forth in claim 11, wherein use is made of the mathematical square of the curvature orthogonal to the direction of the gradient, for defining the curvature.

16. The method as set forth in claim 11, wherein use is made of the product of the main curvatures, for defining the curvature.

17. The method as set forth in claim 11, wherein use is made of a method based on random numbers, for reducing or minimising the curvature.

18. The method as set forth in claim 11, wherein use is made of a Gauβ-Seidl method, for reducing or minimising the curvature.

19. The method as set forth in claim 11, wherein two-dimensional slice images are generated from the continuum data model, after shifting.

20. The method as set forth in claim 11, wherein two-dimensional triangulated surfaces are generated from the continuum model by selecting a chromatic or monochrome value limit.

21. A system for analysing a set of data formed from a plurality of two-dimensional sets of data, for describing a three-dimensional object, comprising:

a) a device for inputting the plurality of two-dimensional sets of data;

b) a device for generating a two-dimensional slice image or a continual three-dimensional data set from the input data, the curvature of areas or hyper areas defined by chromatic or monochrome values being reduced or minimised; and c) a device for outputting the generated data set.

22. The system as set forth in claim 21, wherein the output device is a display.

23. The system as set forth in claim 21, wherein the input device is a device for producing a computer tomograph, an ultrasound or a magnetic nuclear resonance image.

24. A computer program product stored on a computer-compatible medium and comprising the following steps:

reading a discrete original set of data describing a three-dimensional object at discrete supporting points;

reducing or minimising the curvature of an area of the original set of data defined by a chromatic or monochrome value distribution; and generating two-dimensional slice images of the three-dimensional body or generating a three-dimensional data set for a continual description of the body in three-dimensional space.

* * * * *